US012245279B2

(12) United States Patent
Loehr et al.

(10) Patent No.: US 12,245,279 B2
(45) Date of Patent: Mar. 4, 2025

(54) TRANSMITTING A TB AFTER SUCCESSFUL LBT PROCEDURE

(71) Applicant: Lenovo (Singapore) Pte. Ltd., New Tech Park (SG)

(72) Inventors: Joachim Loehr, Wiesbaden (DE); Alexander Johann Maria Golitschek Edler von Elbwart, Darmstadt (DE); Prateek Basu Mallick, Dreieich (DE)

(73) Assignee: Lenovo (Singapore) Pte. Ltd., New Tech Park, Singapore (SG)

(*) Notice: Subject to any disclaimer, the term of this patent is extended or adjusted under 35 U.S.C. 154(b) by 0 days.

(21) Appl. No.: 18/123,924

(22) Filed: Mar. 20, 2023

(65) Prior Publication Data

US 2023/0224966 A1 Jul. 13, 2023

Related U.S. Application Data

(63) Continuation of application No. 17/279,557, filed as application No. PCT/IB2020/057841 on Aug. 20, 2020, now Pat. No. 11,627,605.

(Continued)

(51) Int. Cl.
*H04W 4/00* (2018.01)
*H04L 1/1812* (2023.01)
(Continued)

(52) U.S. Cl.
CPC ....... *H04W 74/0816* (2013.01); *H04L 1/1819* (2013.01); *H04L 1/1887* (2013.01);
(Continued)

(58) Field of Classification Search
CPC ......... H04W 74/0816; H04W 72/1268; H04W 72/23; H04W 74/0808; H04W 16/14;
(Continued)

(56) References Cited

U.S. PATENT DOCUMENTS 11,291,049 B2   3/2022   Loehr et al.
11,503,622 B2  11/2022   Salem et al.
(Continued)

OTHER PUBLICATIONS

NTT Docomo, Inc., "HARQ enhancement for NR-U", 3GPP TSG RAN WG1 Ad-Hoc Meeting 1901 R1-1900955, Jan. 21-25, 2019, pp. 1-8.

(Continued)

*Primary Examiner* — Chuong T Ho
(74) *Attorney, Agent, or Firm* — Kunzler Bean & Adamson

(57) ABSTRACT

Apparatuses, methods, and systems are disclosed for transmitting data using unlicensed spectrum. One apparatus includes a memory comprising instructions executable by a processor to cause the apparatus to receive a single DCI comprising a grant for multiple transmission occasions and to perform a first LBT procedure for transmission of a first TB associated with a first transmission occasion of the grant, where the first LBT procedure results in LBT failure and where the first TB is associated with a first HARQ process. The instructions are further executable by the processor to cause the apparatus to transmit the first TB during a second transmission occasion of the grant associated with a second HARQ process in response to the first LBT procedure resulting in LBT failure.

20 Claims, 11 Drawing Sheets

Related U.S. Application Data

(60) Provisional application No. 62/890,001, filed on Aug. 21, 2019.

(51) Int. Cl.
*H04L 1/1867* (2023.01)
*H04W 72/1268* (2023.01)
*H04W 72/23* (2023.01)
*H04W 74/0808* (2024.01)
*H04W 74/0816* (2024.01)

(52) U.S. Cl.
CPC ....... *H04W 72/1268* (2013.01); *H04W 72/23* (2023.01); *H04W 74/0808* (2013.01)

(58) Field of Classification Search
CPC ... H04L 1/1819; H04L 1/1887; H04L 5/0044; H04L 5/0055
USPC ......................................................... 370/329
See application file for complete search history.

(56) References Cited

U.S. PATENT DOCUMENTS

| | | | |
|---|---|---|---|
| 2017/0223675 A1 | 8/2017 | Dinan et al. | |
| 2019/0075581 A1 | 3/2019 | Salem et al. | |
| 2019/0182865 A1 | 6/2019 | Falahati et al. | |
| 2019/0268912 A1* | 8/2019 | Myung | H04L 1/1887 |
| 2019/0357190 A1 | 11/2019 | Park et al. | |
| 2019/0364592 A1 | 11/2019 | Bhattad et al. | |
| 2020/0045733 A1 | 2/2020 | Tiirola et al. | |
| 2020/0100286 A1* | 3/2020 | Xu | H04L 1/187 |
| 2020/0205090 A1* | 6/2020 | Loehr | H04W 72/21 |
| 2020/0220693 A1* | 7/2020 | Babaei | H04L 1/1812 |
| 2020/0229227 A1 | 7/2020 | Babaei et al. | |
| 2020/0260486 A1* | 8/2020 | Zhou | H04L 1/1835 |
| 2021/0328728 A1* | 10/2021 | El Hamss | H04L 5/0091 |
| 2021/0345408 A1* | 11/2021 | Loehr | H04W 72/23 |
| 2022/0039106 A1 | 2/2022 | Yokomakura et al. | |

OTHER PUBLICATIONS

Huawei et al., "HARQ with autonomous uplink access on LAA SCell", 3GPP TSG-RAN WG2 Meeting #99bis R2-1710368, Oct. 9-13, 2017, pp. 1-5.
OPPO, "Enhancements of configured grant in NR-U", 3GPP TSG-RAN WG2 Meeting #105bis R2-1903285, Apr. 6-12, 2019, pp. 1-5.
Qualcomm Inc., "Remaining Aspects of Configured Grant Transmission for NR-U", 3GPP TSG RAN WG2 Meeting #107 R2-1909842, Aug. 26-30, 2019, pp. 1-4.
Qualcomm Inc., "MAC Scheduling Aspects of Multi-TTI Grant", 3GPP TSG RAN WG2 Meeting #107 R2-1909845, Aug. 26-30, 2019, pp. 1-3.
3GPP, "3rd Generation Partnership Project; Technical Specification Group Radio Access Network; NR; Medium Access Control (MAC) protocol specification (Release 15)", 3GPP TS 38.321 V15.6.0, Jun. 2019, pp. 1-78.

* cited by examiner

TRANSMITTING A TB AFTER SUCCESSFUL LBT PROCEDURE

CROSS-REFERENCE TO RELATED APPLICATIONS

This application is a continuation of U.S. patent application Ser. No. 17/279,557 entitled "TRANSMITTING A TB AFTER SUCESSFUL LBT PROCEDURE" and filed on Mar. 24, 2021 for Joachim Loehr, Alexander Johann Maria Golitschek Edler von Elbwart, and Prateek Basu Mallick, which application is a national stage entry of International Patent Application PCT/IB2020/057841 entitled "TRANSMITTING A TB AFTER SUCESSFUL LBT PROCEDURE" and filed on Aug. 20, 2020, which application is are incorporated herein by reference. International Application PCT/IB2020/057841 claims priority to U.S. Provisional Patent Application No. 62/890,001 entitled "LOGICAL CHANNEL RESTRICTION FOR MULTI-TTI SCHEDULING IN NR-U" and filed on Aug. 21, 2019 for Joachim Loehr, Alexander Johann Maria Golitschek Edler von Elbwart, and Prateek Basu Mallick, which application is incorporated herein by reference.

FIELD

The subject matter disclosed herein relates generally to wireless communications and more particularly relates to data transmission on unlicensed spectrum.

BACKGROUND

Certain wireless communication systems may support License Assisted Access ("LAA"), where waveforms and frame structures of licensed access networks (e.g., a Third Generation Partnership Project ("3GPP") radio access network ("RAN")) are transmitted over unlicensed frequency bands. Such wireless communication systems may also support autonomous uplink ("AUL") transmissions over unlicensed frequency bands. AUL transmissions do not require a prior scheduling request or an explicit scheduling grant from a RAN node.

For Long-Term Evolution ("LTE") evolved LAA ("eLAA"), AUL transmissions can be enabled through a combination of Radio Resource Control ("RRC") signaling and an activation message conveyed by a Downlink Control Information ("DCI") in a physical control channel. The RRC configuration includes subframes in which the User Equipment ("UE") is allowed to transmit autonomously, as well as eligible Hybrid Automatic Repeat Request ("HARQ") process identifiers ("IDs"). The activation message includes the resource block assignment ("RBA") and Modulation and Coding Scheme ("MCS"), from which the UE is able to determine the transport block ("TB") size for any AUL transmission.

It is possible to autonomously retransmit data pertaining to a TB that has not been received correctly by the evolved Node B ("eNB"). For this purpose, the UE monitors AUL Downlink Feedback Information ("AUL-DFP"), which can be transmitted by the eNB and includes HARQ-ACK information for the AUL-enabled HARQ process IDs. As used herein, "HARQ-ACK" may represent collectively the Positive Acknowledge ("ACK") and the Negative Acknowledge ("NACK"). ACK means that a TB is correctly received while NACK means a TB is erroneously received.

In case the UE detects a NACK message, it may try to autonomously access the channel for a retransmission of the same TB in the corresponding HARQ process. As a safeguard against errors, an autonomous uplink transmission includes at least the HARQ process identifier ("ID") and a new data indicator ("NDP") accompanying the Physical Uplink Shared Channel ("PUSCH") transmission, e.g., in AUL Uplink Control Information ("AUL-UCP"). In case the AUL-DFI is not received within a certain window, the UE should also assume NACK for pending AUL transmissions and may therefore try to use a subsequent AUL occasion for a retransmission.

BRIEF SUMMARY

Disclosed are procedures for transmitting data using unlicensed spectrum. Such procedures may be implemented by apparatuses, systems, methods, and program products according to various embodiments.

One method for transmitting data using unlicensed spectrum includes receive a single DCI comprising a grant for multiple transmission occasions and to perform a first LBT procedure for transmission of a first TB associated with a first transmission occasion of the grant, where the first LBT procedure results in LBT failure and where the first TB is associated with a first HARQ process. The instructions are further executable by the processor to cause the apparatus to transmit the first TB during a second transmission occasion of the grant associated with a second HARQ process in response to the first LBT procedure resulting in LBT failure.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
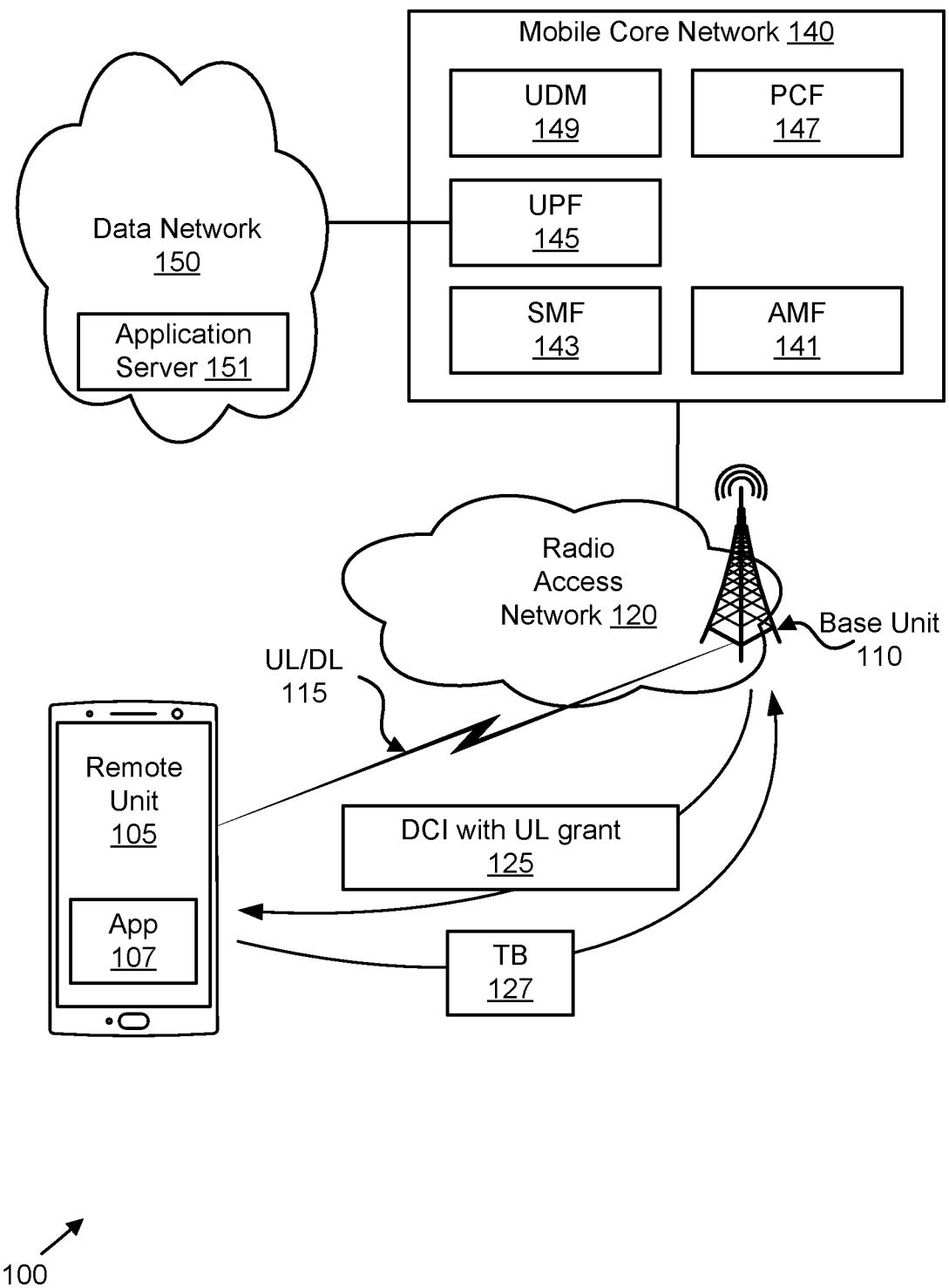
FIG. 1 is a schematic block diagram illustrating one embodiment of a wireless communication system for transmitting data using unlicensed spectrum.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM"), an electronically erasable programmable read-only memory ("EEPROM"), Flash memory, a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for Logical Channel ("LCH") restriction for multi-TTI scheduling in unlicensed access in New Radio ("NR-U"). It should be noted that even though the term multi-TTI grant is used throughout the document, a single DCI allocating multiple PUSCH transmissions to a UE may be also referred to as a "multi-PUSCH grant." The gNB can allocate multiple PUSCH transmissions in a single DCI that span over several consecutive slots (or TTIs), referred to as a multi-TTI grant. Generally, these multiple PUSCH transmissions have the same TB size in the multi-TTI grant. Upon receiving a multi-TTI grant, the UE multiplexes data in its buffer to form one or more TBs, according to the grant. For multi-TTI grant scheduling, certain wireless communication systems may support the following characteristics:

For multiple PUSCH transmissions scheduled by a single DCI, the NDI and redundancy version ("RV") fields in DCI are signaled per PUSCH transmission.

If Code Block Group ("CBG")-based re-transmission is supported for multi-TTI scheduling, there may be limitations on number of re-transmitted PUSCH for which CBG transmission information ("CBGTI") field is signaled per re-transmitted PUSCH.

Alternatively, if CBG-based re-transmission is supported for multi-TTI scheduling, there may be limitations on number of re-transmitted PUSCH for which CBGTI field is signaled per PUSCH.

Alternatively, if CBG-based re-transmission is supported for multi-TTI scheduling, there may be limitations on number of re-transmitted PUSCH for which CBGTI field is signaled only for a fixed number of PUSCHs. The Channel State Information ("CSI") request field in the DCI applies to a single PUSCH.

For multiple PUSCH transmissions scheduled by a single DCI, the HARQ process ID signaled in the DCI may apply to the first scheduled PUSCH. The HARQ process ID is then incremented by 1 for subsequent PUSCH transmissions in the scheduled order (with modulo operation as needed).

For multiple PUSCH transmissions scheduled by a single DCI, time domain resource assignment mechanism may be enhanced for indicating the number of scheduled mapping Type A and Type B PUSCHs, and their starting and ending symbols. Here, at least continuous time domain resource assignment is supported. In certain embodiments, multiple mapping Type B PUSCHs may be allowed within the first slot. In certain embodiments, multiple starting positions may be allowed for UE-initiated Channel Occupancy Time ("COT").

AUL transmissions are also supported for NR-U. In addition to AUL transmissions, multi-TTI grant scheduling is also supported for NR-U. It allows 5G/NewRadio Node B ("gNB") to allocate multiple PUSCH transmissions to a UE using a single DCI. It is considered as an essential feature for NR-U, as it reduces the number of Listen-Before-Talk ("LBT") operations performed by the UE to transmit uplink ("UL") data. The UE performs LBT before the start of the first PUSCH allocation scheduled by a multi-TTI grant. Instead of being required to performing LBT for each PUSCH independently, the UE can initiate the transmission of multiple TBs from the time instance where LBT succeeds until the last PUSCH allocation of the multi-TTI grant given that the length of the multi-TTI grant allocations is within the Maximum Channel Occupancy Time ("MCOT").

According to the Logical Channel Prioritization ("LCP") procedure specified for New Radio ("NR"), the UE multiplexes high priority data (including medium access control ("MAC") control elements ("CEs")) first in a TB respectively PUSCH allocation. For a multi-TTI grant case this means that the high priority data is placed in the first TB respectively is transmitted within the first PUSCH allocation. However, following this principle for a multi-TTI grant in NR-U is likely to result in a case where the UE is not able to transmit high priority data or MAC CE due to LBT failure—or part of the transmission is lost due to a later access to the channel, so that the corresponding TB would not be decodable without further (later) retransmission(s).

Because the UE performs LBT to initiate sequence of UL transmissions within the multi-TTI grant, the first UL grant is the most probable instance where UL transmission failure may occur due to Clear Channel Assessment ("CCA") failure.

Furthermore, current networks do not define whether the first uplink grant/PUSCH allocation spans only over a partial slot, or whether the UE may try to use the first slot at multiple starting positions. If a part of the first slot cannot be used due to the channel becoming available after the indicated symbol, part of the first slot transmission is lost, so that the corresponding TB would not be decodable without further (later) retransmission(s). Therefore, mapping high priority data in the first PUSCH may result in an increased delay for the transmission of the high priority data due to necessary HARQ retransmissions. As described herein, a MAC CE is treated as high priority data. In some embodiments, an LCH with priority greater than threshold level will also be considered high priority data. Note that where a lower priority parameter value indicates a higher priority level, then an LCH with indicated priority parameter value less than (or equal to) threshold value is considered high priority.

In the following the term eNB/gNB is used for the base station but it is replaceable by any other radio access node, e.g., Base Station ("BS"), eNB, gNB, Access Point ("AP"), NR node, etc. Further the proposed methods are described mainly in the context of Fifth Generation ("5G") NR. However, the proposed solutions/methods are also equally applicable to other mobile communication systems supporting serving cells/carriers being configured in an unlicensed spectrum LTE mobile wireless or cellular telecommunications system.

It should be noted that throughout the document the term "multi-PUSCH grant" refers to a DCI (UL grant) which schedules multiple PUSCH allocations, i.e., multiple UL resources/UL grants/UL allocations by means of a single DCI. A multi-PUSCH grant may also be referred to as a "multi-TTI grant." It should be further noted that one UL resource may comprise multiple TBs/PUSCH(s), e.g., for Single User Multiple Input Multiple Output ("SU-MIMO") transmissions. Further one UL resource may correspond to one or multiple slot(s) respectively partial slot or mini-slot.

According to a first solution, a multi-PUSCH grant explicitly indicates whether high priority data should be mapped to the first predefined number 'x' of UL allocation(s)/UL grants of the multiple UL allocations allocated within the multi-PUSCH grant. For example, DCI may indicate whether high priority data is permitted to be multiplexed into the first 'x' number of slots/TTI. Note that the first solution is a gNB-controlled solution.

According to a second solution gNB restricts the first predefined number 'y' UL allocation(s) of a multi-PUSCH grant to carry only data of certain logical channels. Here, the gNB signals LCH restriction that applies to the first 'y' PUSCH allocations of a multi-PUSCH grant. When LCH restriction is activated, then only certain specified LCH are allowed to the multiplexed into the first 'y' TBs (each TB corresponding to an allocation of the multi-PUSCH grant). For example, delay-tolerant services may be allowed for the first 'y' allocations. In one embodiment, the RRC configuration of an LCH indicates whether the data for the LCH is permitted to be multiplexed into the first 'y' allocations when LCH restriction is indicated. Note that the second solution is a gNB-controlled solution.

According to a third solution a UE may transmit a TB pending for transmission in a HARQ process due to a failed LBT in a different HARQ process being associated with a PUSCH for which LBT was successful. This is a UE-internal operation. Here, the UE is permitted to transmit out-of-order a pending TB (i.e., pending for a first HARQ process) that was not transmitted due to LBT failure. The first TB can be moved to a second HARQ process of the multi-PUSCH grant (i.e., associated with the next-in-line allocation/slot). Thereby, the high priority data is transmitted with minimal delay.

The third solution may involve HARQ process remapping internally in the HARQ buffers so that the UE maps the already generated TB(s) to another/different HARQ process in the case of LBT failure. The assumption is that all grants of the multi-PUSCH grant have the same TB size, so that the TBs can be easily bumped to another PUSCH. In one flavor of the third solution, the UE generates the TBs according to legacy LCP procedure and transmits the first TB in the first available slot (i.e., first PUSCH for which there is LBT success).

According to a fourth solution, an indication is given by the gNB whether the UE is to map high priority data to the first predefined number 'x' UL resource(s) immediately following a CCA/LBT procedure. Note that the TB will be generated before the CCA/LBT procedure is performed. For example, when so signaled, the UE does not map high priority data to the first 'x' UL resource(s) of a channel occupancy for which the UE had to undergo the LBT procedure. Note that the fourth solution is quite related to the first solution.

According to a fifth solution, an indication is given by the gNB whether the UE restricts the first predefined number 'y' UL resource(s) immediately following a CCA/LBT procedure to carry only data of certain logical channels. Note that the fifth solution is quite related to the second solution.

According to a sixth solution, a UE may transmit a TB pending for transmission in a HARQ process due to a failed LBT in a different HARQ process being associated with a PUSCH for which LBT was successful. The sixth-solution is a UE-internal operation. In case of undergoing a CCA/LBT procedure, the first UL resource has the highest probability of not being transmitted due to LBT failure. Note that the sixth solution is related to the third solution. These solutions are discussed in further detail below with reference to the Figures.

FIG. 1 depicts a wireless communication system 100 for transmitting data using unlicensed spectrum, according to embodiments of the disclosure. In one embodiment, the wireless communication system 100 includes at least one remote unit 105, a RAN 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via UL and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone, or Voice-over-Internet-Protocol ("VoIP") application) in a remote unit 105 may trigger the remote unit 105 to establish a Protocol Data Unit ("PDU") session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a RAN, such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over one or more Application Programming Interfaces ("APIs")), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as a Mobility Management Entity ("MME"), a Serving Gateway ("SGW"), a Packet data network Gateway ("PGW"), a Home Subscriber Server ("HSS"), and the like. In certain embodiments, the mobile core network 140 may include an Authentication, Authorization, and Accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a Single Network Slice Selection Assistance Information ("S-NSSAI"), while a set of network slices for which the remote unit 105 is authorized to use is identified by Network Slice Selection Assistance Information ("NSSAI") (e.g., a vector value including one or more S-NSSAI values). In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for transmitting data using unlicensed spectrum apply to other types of communication networks and RATs, including Institute of Electrical and Electronics Engineers ("IEEE") 802.11 variants, Global System for Mobile Communications ("GSM"), General Packet Radio Service ("GPRS"), Universal Mobile Telecommunications System ("UMTS"), LTE variants, CDMA2000, Bluetooth, ZigBee, Sigfox, and the like. For example, in an LTE variant involving an EPC, the AMF 135 may be mapped to an MME, the SMF may be mapped to a control plane portion of a PGW and/or to an MME, the UPF may be mapped to an SGW and a user plane portion of the PGW, the UDM/UDR may be mapped to an HSS, etc.

In various embodiments, the base unit 121 transmits DCI 125 to the remote unit(s) 105. As noted above, the DCI may schedule multiple UL resources/UL grants/UL allocations by means of a single DCI (referred to as a "multi-PUSCH" and/or "multi-TTI" allocation), where one UL resource may comprise multiple TBs/PUSCH(s), e.g., for SU-MIMO transmissions and may further correspond to one slot or partial slot or mini-slot. The DCI 125 may indicate whether the remote unit 105 is to put high priority data in a first PUSCH of the multi-TTI allocation.

The remote unit 105 generates TBs 127 according to LCP rules for multi-PUSCH/multi-TTI grant and is allowed to shift a generated TB, e.g., to a HARQ process associated with the PUSCH for which LBT was successful. The LCP rules for multi-PUSCH/multi-TTI grant may be legacy LCP rules and/or may be modified LCP rules (e.g., signaled by DCI) according to the disclosed solutions. When following legacy LCP rules, the remote unit 105 multiplexes the high priority data first. Thus, the first TB will generally contain high priority data.

In NR-U, the remote unit 105 needs to perform LBT before getting access to the channel (PUSCH). If the LBT fails, the first TB is then pending in a HARQ buffer. Looking at statistical probability, the first PUSCH/slot/TTI of a multi-PUSCH grant is the one with the greatest chance for LBT failure, i.e., because LBT failure of the second PUSCH/slot/TTI in multiple consecutive PUSCHs/slots/TTIs is necessarily predicated upon the first slot also failing LBT (e.g., the combined probability of the first two slots failing LBT). The invention solves the problem of the risk of high priority data being stuck in the HARQ buffer waiting retransmission.

When access is gained for the second PUSCH/slot/TTI of a multi-PUSCH grant (i.e., because LBT succeeds), then the second TB (e.g., containing little to no high-priority data) is sent. This can result in the high priority data being delayed (due to LBT failure for the first PUSCH/slot) while the low priority data is transmitted. Disclosed herein are solutions to minimize delay of high priority data in a NR-U system.

Figure 2:
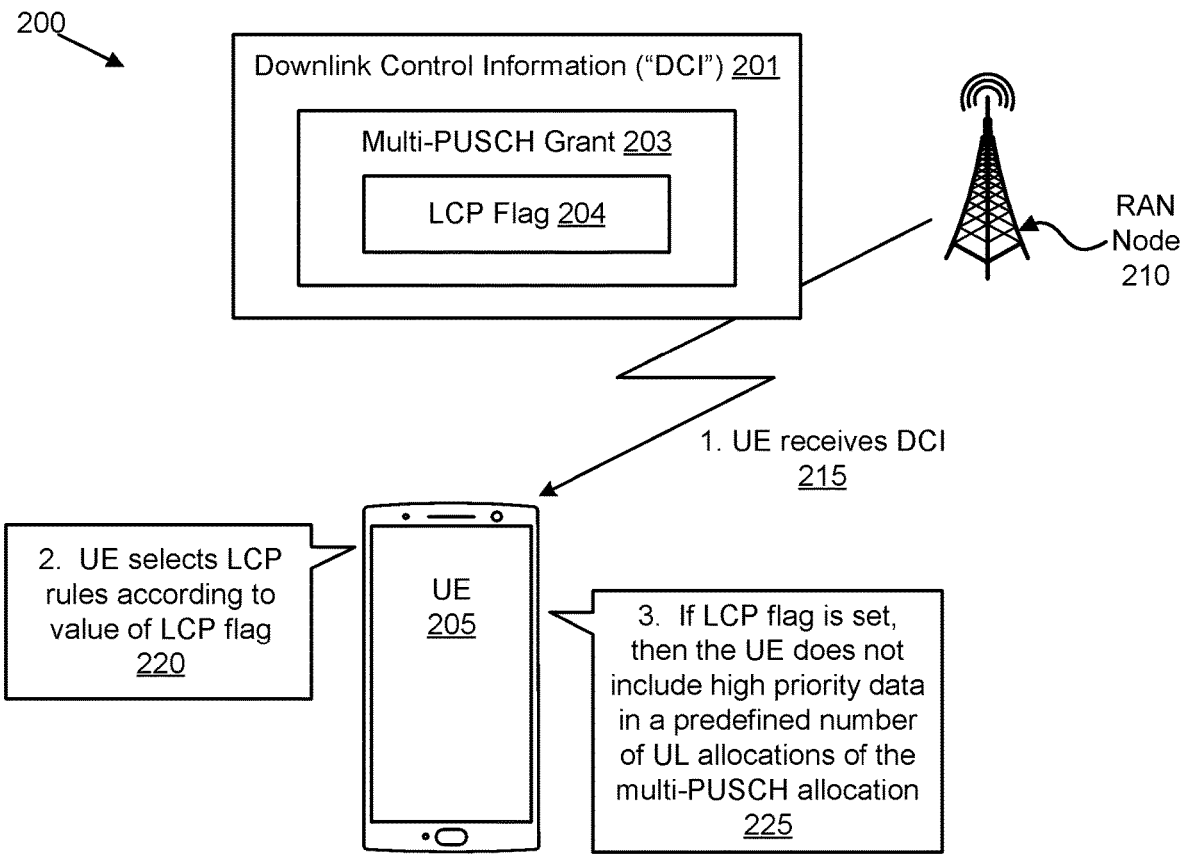
FIG. 2 is a diagram illustrating one embodiment of a first solution for transmitting data using unlicensed spectrum.

FIG. 2 depicts a RAN 200 implementing the first solution for transmitting data using unlicensed spectrum, according to embodiments of the disclosure. The RAN 200 includes a UE 205 and a RAN node 210 which transmits DCI 201. According to the first solution, a multi-PUSCH grant explicitly indicates via the LCP flag 204 whether high priority data should be mapped to the first predefined number 'x' of UL allocation(s)/UL grants of the multiple UL allocations allocated within the multi-TTI grant 203 (e.g., a multi-PUSCH grant). The number 'x' may be configured by higher layer signaling or specified in the standard. In the simplest case, x=1.

According to one implementation of the first solution, a one-bit flag within a multi-TTI grant 203 of the DCI 201 indicates whether the UE 205 (e.g., a remote unit 105) should map high priority data to the first predefined number 'x' of UL allocation(s) (Case A), or whether such high priority data shall not be mapped to the first predefined number 'x' of UL allocation(s) (Case B).

For example, according to one implementation, setting the one-bit flag set to '1' indicates Case B, where the UE 205 is not to map high priority data to the first 'x' UL allocations of the multiple UL allocations(s). In contrast, setting the one-bit flag set to '0' indicates Case A, where the UE 205 is to follow the legacy LCP procedure for all the UL allocations scheduled by the multi-TTI grant 203. Such a flag 204 therefore functionally resembles an LCP priority mapping indication/LCH restriction indication, or a high priority data barring flag.

According to one implementation of the first solution, a UE 205 upon having received a multi-TTI grant 203 indicating that the mapping of high priority data is prohibited for the first 'x' UL allocations (i.e., Case B, above), does not multiplex any MAC CE(s) to the first 'x' UL allocation(s). Alternatively, the UE 205 may be allowed to multiplex low-priority MAC CE(s), e.g., for padding, to the first 'x' UL allocation(s) for cases when high priority data mapping is prohibited. Examples of low-priority MAC CEs include, but are not limited to, MAC CE for Recommended bit rate query and MAC CE for Buffer Status Report ("BSR").

According to a further implementation of the first solution, the UE 205 does not multiplex data of LCH(s) having a logical channel priority which is higher than a predetermined threshold to the first 'x' UL allocations for cases when a multi-TTI grant 203 indicates that the mapping of high priority data to the first 'x' UL allocations is prohibited (i.e., Case B). The priority threshold may be preconfigured by higher layer signaling such as RRC signaling or fixed by specification. The LCH(s) having a logical channel priority higher (or equal) to the configured threshold are not considered for the LCP procedure, e.g., LCH restriction according to the priority is performed by the UE 205 for the first 'x' UL allocation(s).

For cases when the multi-TTI grant 203 indicates that the mapping of high priority data is prohibited for the first 'x' UL allocations (i.e., Case B), the UE 205 applies the legacy LCP procedure/TB generation procedure (without any priority restrictions) for the remaining UL allocations of the multi-TTI grant 203, i.e., starting from the 'x+1' UL allocation.

According to a variant of the first solution, the UE 205 is configured by RRC with a priority threshold, and additionally a triggering indication is contained in the UL resource grant (e.g., DCI). Said triggering indication specifies whether the UE 205 follows the configured behavior or not in the granted UL resource.

Figure 3:
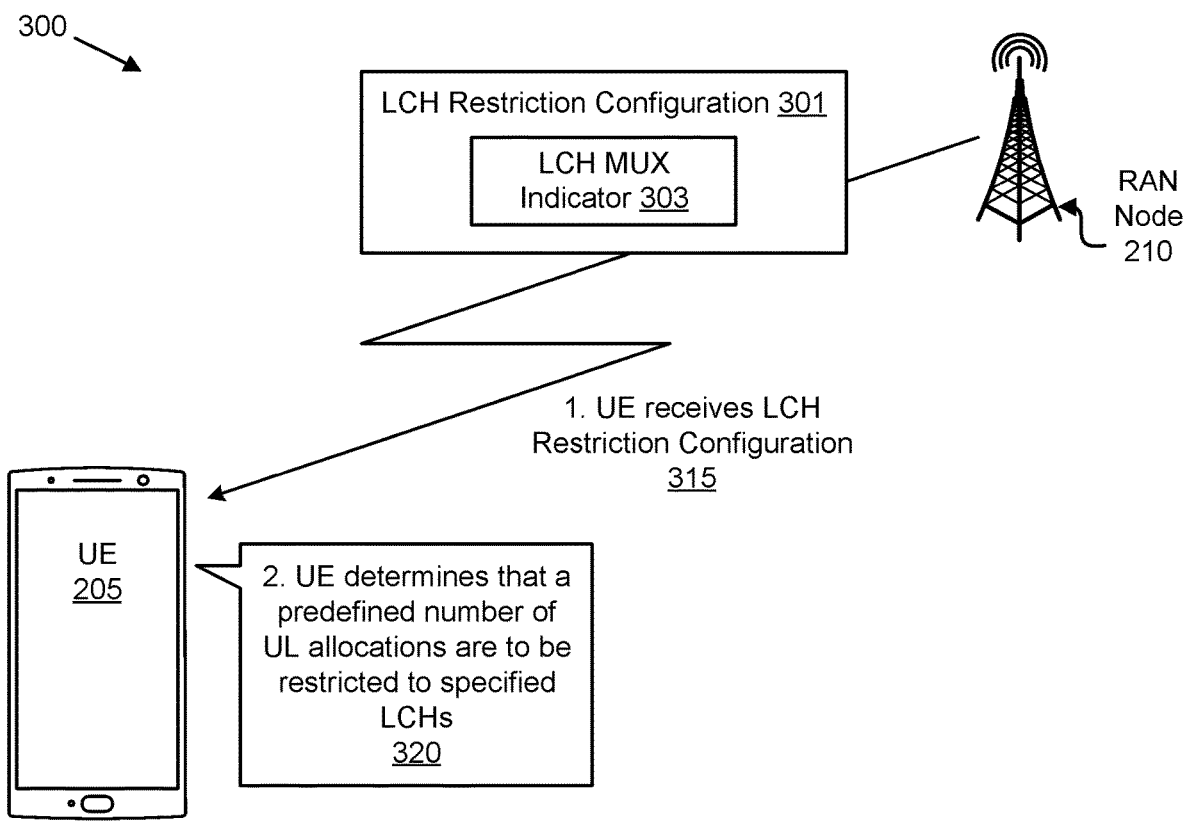
FIG. 3 is a diagram illustrating one embodiment of a second solution for transmitting data using unlicensed spectrum.

FIG. 3 depicts a RAN 300 implementing the second solution for transmitting data using unlicensed spectrum, according to embodiments of the disclosure. The RAN 300 includes the UE 205 and the RAN node 210. According to the second solution, the RAN node 210 restricts the first predefined number 'y' UL allocation(s) of a multi-PUSCH/multi-TTI grant to carry only data of certain logical channels. For example, LCP rules may be modified such that only those logical channels which are delay tolerant, e.g., whose service can tolerate large transmission delay, are mapped to the first 'y' UL allocation(s) of a multi-TTI grant. The RAN node 210 may send a configuration 301 for a logical channel, indicating whether its data can be multiplexed to the first 'y' UL allocation(s) of a multi-PUSCH grant (see LCH multiplex ("MUX") indicator 303).

According to one specific implementation of the second solution, an RRC configuration for each logical channel indicates whether data of the corresponding logical channel can be multiplexed to the first 'y' UL allocation(s) of a multi-TTI grant. Here, the LCH MUX indicator 303 may be a one bit flag in the LogicalChannelConfig information element ("IE"), e.g., RRC configuration, according to one specific implementation. Alternatively, only logical channels/bearer configured with a certain 5G Quality of Service Indicator ("5QI") value are allowed to be mapped to the first 'y' UL allocation(s) of a multi-TTI grant.

According to a variant of the second solution, the UE 205 may be configured by RRC with one or more logical channel(s) for which data of the corresponding logical channel may be multiplexed to the first 'y' UL allocation(s) of a multi-TTI grant, and additionally a triggering indication may be contained in the UL resource grant (e.g., DCI). The triggering indication indicates whether the UE 205 follows the modified LCP rules (e.g., Case B) or follows default (legacy) LCP rules in the granted UL resource (e.g., Case A). Said triggering indication may be communicated from the RAN node 210 to the UE 205 in DCI, as described above in the first solution. Based on the indication(s) (i.e., LCH MUX indicator 303 and, optionally, triggering indication in DCI), the UE 205 determines that a predefined number of UL allocations (e.g., of a multi-PUSCH grant) are to be restricted to certain LCHs (i.e., specified using the LCH MUX indicator 303, see block 320).

Figure 4:
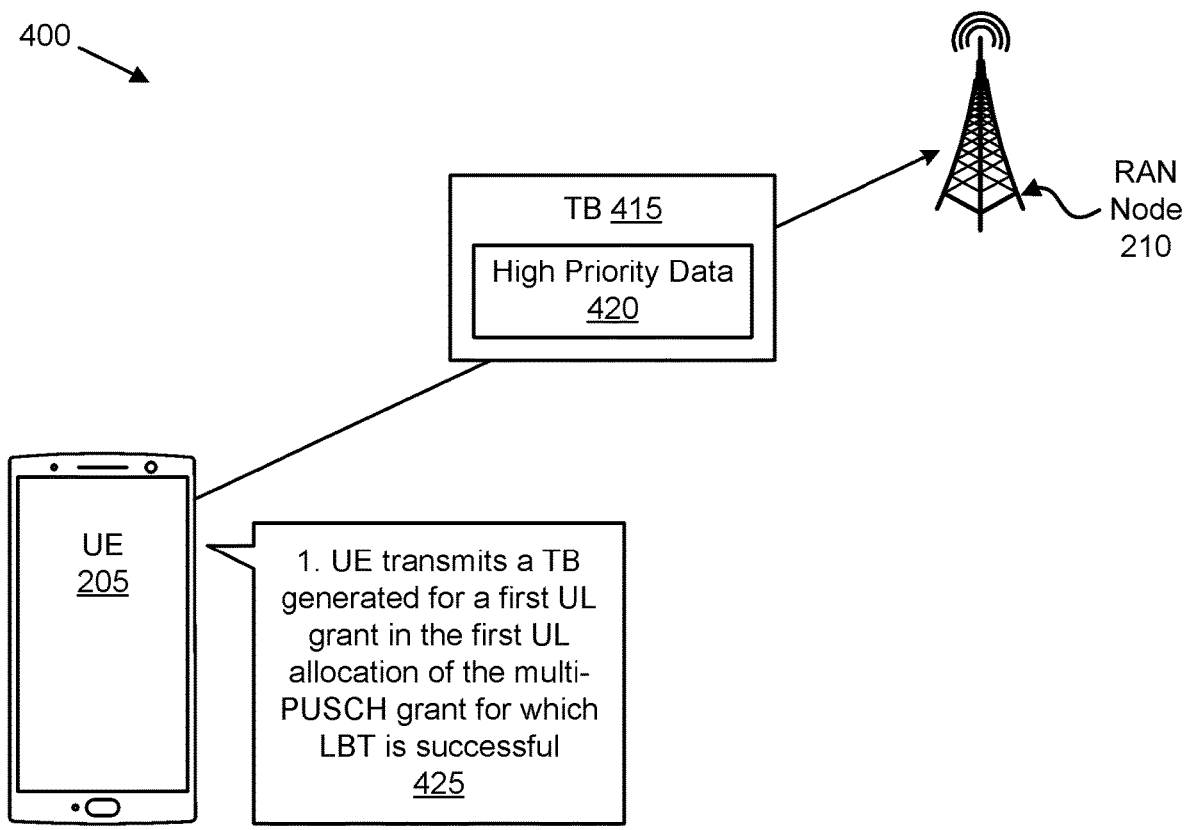
FIG. 4 is a diagram illustrating one embodiment of a third solution for transmitting data using unlicensed spectrum.

FIG. 4 depicts a RAN 400 implementing the third solution for transmitting data using unlicensed spectrum, according to embodiments of the disclosure. The RAN 400 includes the UE 205 and the RAN node 210. According to the third solution, a UE 205 may, due to a failed LBT, transmit a TB pending for transmission in a first HARQ process in a different HARQ process being associated with a PUSCH for which LBT was successful. Put differently, if the UE 205 experiences a failed LBT for a PUSCH associated with the first HARQ process, then the TB pending for transmission in the first HARQ process may be transmitted using a PUSCH associated with a different HARQ process for which LBT was successful.

In case of a multi-PUSCH/multi-TTI grant, the first UL allocation has the highest probability of LBT failure. Note, however, that according to legacy LCP rules a TB generated for the first UL allocation is likely to contain high priority data. Therefore, the UE 205 may transmit the TB 415 generated for the first UL grant, which contains the high priority data 420 in the UE's buffer including potential MAC CE(s), in the first UL allocation of the multi-PUSCH grant for which LBT is successful (see block 425).

According to one implementation of the third solution, the UE 205 processes the UL grants scheduled within the multi-PUSCH grant in the signaled order and generates the corresponding TB(s) according to the current standardized LCP procedure (e.g., as described in NR Rel-15). However, in order to not delay the transmission of higher priority packets for which delay may not be acceptable (e.g., for Ultra-Reliable and Low-Latency Communications ("URLLC") data), the UE 205 may map the generated TB(s) internally to different HARQ processes in case of LBT failure(s). Given the assumption that the TB size is the same for all or at least several UL grants scheduled by a multi-PUSCH grant, the dynamic mapping of TB(s) to HARQ processes should not impose any technical problems, e.g., pending TB is transmitted on a different HARQ process for which associated TB size is the same.

In a variant of the third solution, the UE 205 may transmit the TB 415 generated for the first UL grant, which contains the high priority data 420 in the UE's buffer including potential MAC CE(s), in the first non-partial slot of the multi-PUSCH grant for which LBT is successful. In a variant of the third solution, this behavior is allowed or not allowed according to an indication from the RAN node 210. In other words, if the UE 205 is not indicated as being allowed, then the high priority data is mapped to the TB(s) according to the legacy LCP procedure, e.g., contained in the TB associated with the first granted UL resource; otherwise, the UE 205 is permitted to map high priority data 420 contained in the TB to the first or later granted UL resource(s). This indication could be an RRC configuration, or a MAC control element, or part of an UL resource grant.

Alternatively, this behavior is ordered or not ordered according to an indication. In other words, if the UE 205 is not indicated as being ordered, then the high priority data 420 is mapped to the TB(s) according to the legacy LCP procedure, e.g., contained in the TB associated with the first granted UL resource; otherwise, the UE 205 has to shift the TB with the high priority data to the first UL grant for which LBT was successful. This indication could be an RRC configuration, or a MAC control element, or part of an UL resource grant.

According to another implementation of the third solution, the UE 205 generates the TB(s) corresponding to the different UL grants of a multi-PUSCH/multi-TTI grant according to the legacy LCP procedure. In case LBT is successful for the first UL grant, the UE 205 transmits the first generated TB 415 (i.e., containing the high priority data 420) in the first UL allocation. In case LBT fails for the first UL allocation but is successful for the second UL grant/allocation, the UE 205 transmits the first generated TB 415 in the second UL allocation.

Essentially, the UE 205 transmits the first generated TB to the first UL grant/allocation for which LBT was successful, e.g., assuming the TB sizes for the UL grants are the same. The UE 205 may store the second generated TB ("TB2"), which was originally intended for the second UL grant, in the HARQ process associated with the first UL grant pending for a HARQ retransmission. Alternatively, the UE 205 may transmit the second generated TB in a third UL allocation/grant. As such, the UE 205 may transmit the subsequently generated TB(s) in the subsequent UL allocations/UL grants for which LBT is successful. Upon transmitting the first generated TB 415 in a subsequent UL allocations/UL grant, the HARQ Tx buffer of the first UL grant(s) for which LBT was not successful may be kept empty.

It should be noted that the described UE behavior according to above embodiments is not restricted to multi-PUSCH grants only, but should be equally applicable to other types of UL transmissions in NR-U. For example, the UE behavior according to the third solution is also applicable to AUL/configured grant transmissions.

Figure 5:
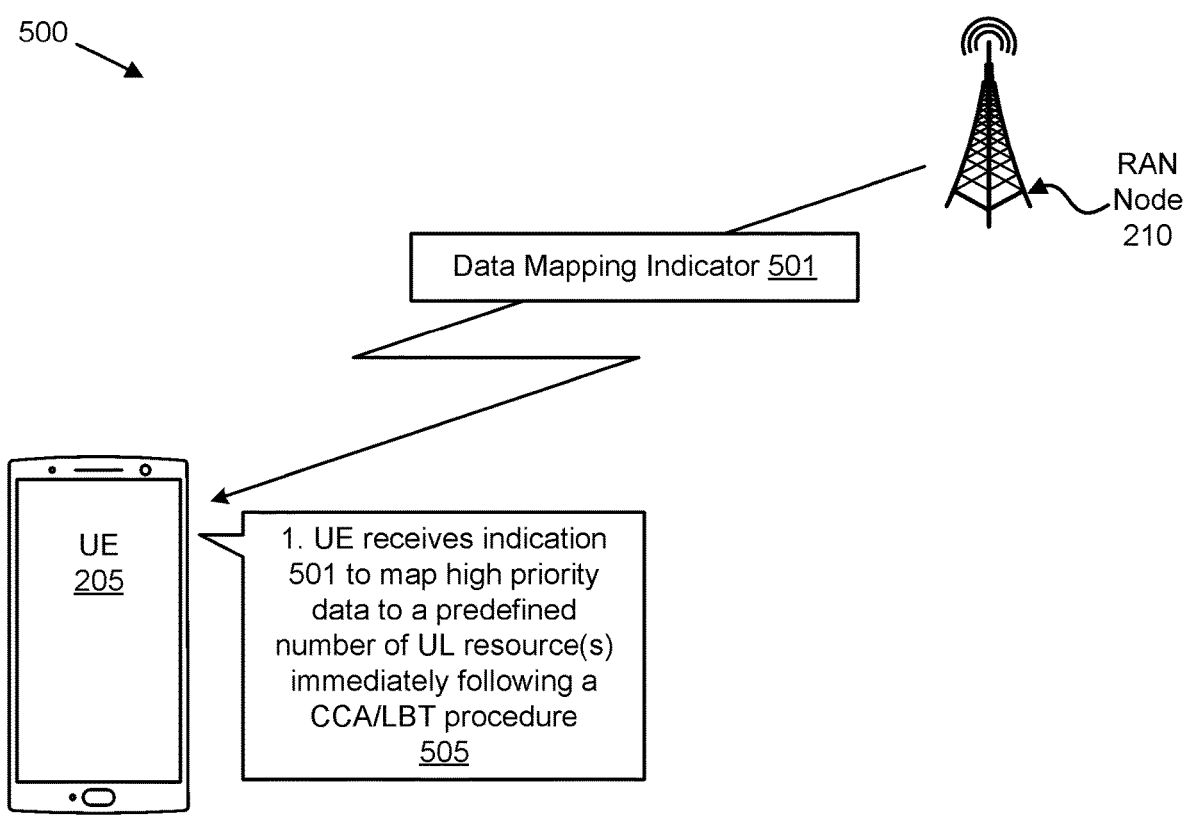
FIG. 5 is a diagram illustrating one embodiment of a fourth solution for transmitting data using unlicensed spectrum.

FIG. 5 depicts a RAN 500 implementing the fourth solution for transmitting data using unlicensed spectrum, according to embodiments of the disclosure. The RAN 500 includes the UE 205 and the RAN node 210. According to the fourth solution, a data mapping indication 501 is given by the RAN node 210 whether the UE 205 is to map high priority data to the first predefined number 'x' UL resource(s) immediately following a CCA/LBT procedure, which is, for example, the case for the first 'x' UL resource(s) of a channel occupancy for which the UE 205 had to undergo the LBT procedure (see block 505).

For example, if the UE 205 is granted two or more contiguous UL resources in time (regardless whether as a result of multiple individual UL grants, or multi-PUSCH/multi-TTI grant(s)), then usually for the first such UL resource the UE 205 has to do LBT, while for the second or later such UL resource no LBT is necessary if the transmission in the preceding such UL resource was allowed and performed. Accordingly, high priority data can be sent in contiguous UL resources immediately following a successful CCA/LBT procedure with minimal risk of delay.

In one embodiment, the data mapping indication 501 to map high priority data to the first 'x' UL resource(s) may be an RRC configuration. In another embodiment, the data mapping indication 501 to map high priority data to the first 'x' UL resource(s) may be an element in a DCI carrying the single- or multi-TTI UL grant(s).

In one variant of the fourth solution, said data mapping indication 501 is only observed for the first 'x' UL resources, where the granted two or more contiguous UL resources in time is larger than 'x.' In another variant of the fourth solution, the data mapping indication 501 is only observed if the UE 205 is aware that at least one more UL resource is available for transmission immediately after the first such UL resource.

As an example of this variant, if a UE 205 has received grants for two UL transmissions in resource r1 and in resource r2, where the UE 205 needs to undergo the LBT procedure prior to transmitting in resource 1, where further the LBT procedure succeeds so that the UE 205 can transmit in resource r1, and wherein resource r2 is not immediately following resource r1, then said data mapping indication 501 is not observed for the transmission in resource 1. On the other hand, if resource r2 is immediately following resource r1, or generally no new LBT procedure needs to be undergone for the transmission in resource r2, then said data mapping indication 501 is observed and followed for the transmission in resource r1.

Figure 6:
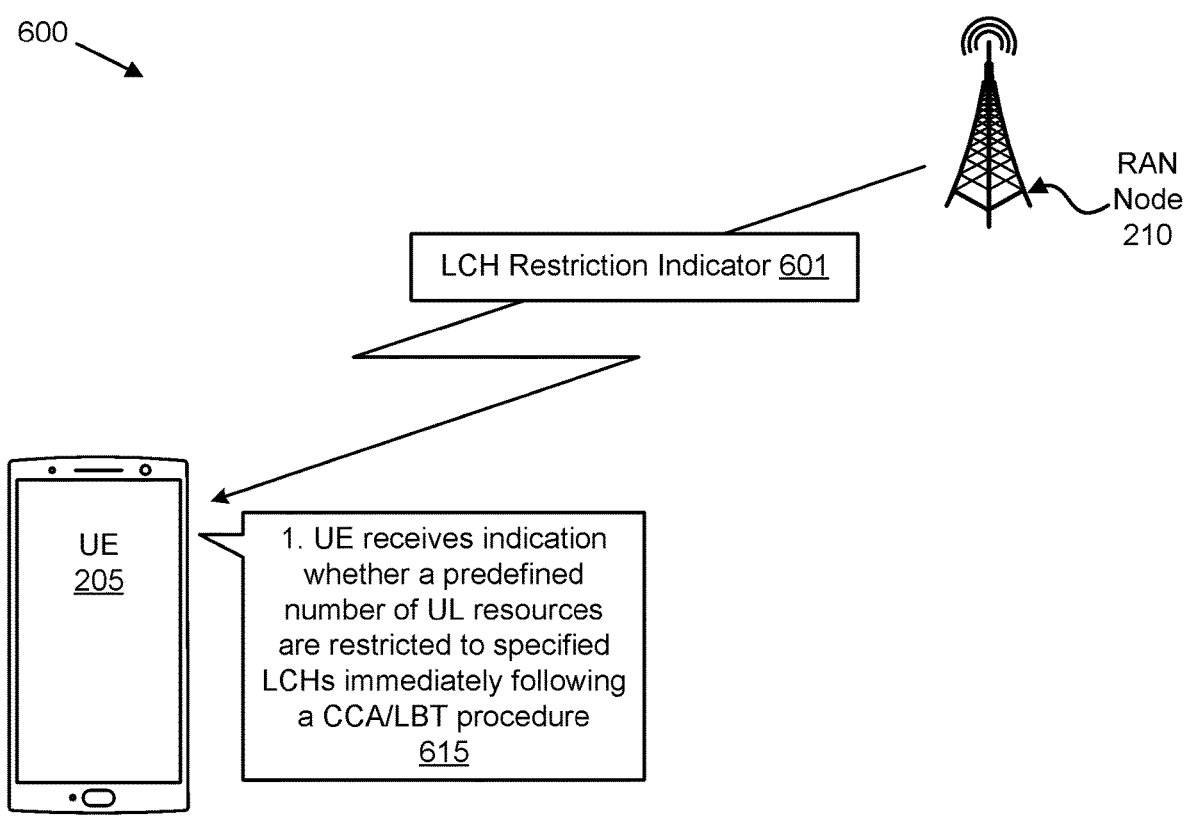
FIG. 6 is a diagram illustrating one embodiment of a fifth solution for transmitting data using unlicensed spectrum.

FIG. 6 depicts a RAN 600 implementing the fifth solution for transmitting data using unlicensed spectrum, according to embodiments of the disclosure. The RAN 600 includes the UE 205 and the RAN node 210. According to the fifth solution, an LCH Restriction indication 601 is given by the RAN node 210 whether the UE 205 restricts the first predefined number 'y' UL resource(s) immediately following a CCA/LBT procedure to carry only data of certain logical channels. For example, only those logical channels which are delay tolerant, e.g., service can tolerate large transmission delay, may be mapped to the first 'y' UL resource(s) immediately following a CCA/LBT procedure.

According to one specific implementation, RRC configuration for each logical channel is indicating whether data of the corresponding logical channel can be multiplexed to the first 'y' UL resource(s) immediately following a CCA/LBT procedure. Like the second solution, this configuration may be done by means of a one bit flag in the LogicalChannelConfig IE, e.g., RRC configuration, according to one specific implementation. Alternatively, only logical channels/bearer configured with a certain 5QI value are allowed to be mapped to the first 'y' UL resource(s) immediately following a CCA/LBT procedure.

According to a variant of the fifth solution, said LCH Restriction indication 601 is only observed if the UE 205 is aware that its channel occupancy includes at least two adjacent UL resources in time domain. For example, if a UE 205 has received grants for two UL transmissions in resource r1 and in resource r2, where the UE 205 needs to undergo the LBT procedure prior to transmitting in resource 1, where further LBT succeeds so that the UE 205 can transmit in resource r1, and wherein resource r2 is not immediately following resource r1, then said LCH Restriction indication 601 is not observed for the transmission in resource 1. If on the other hand resource r2 is immediately following resource r1, or generally no new LBT procedure needs to be undergone for the transmission in resource r2, then said LCH Restriction indication 601 is observed and followed for the transmission in resource r1.

According to another variant of the fifth solution, the UE 205 is configured by RRC with one or more logical channel(s) for which data of the corresponding logical channel may be multiplexed to the first 'y' UL resource(s) of a multi-TTI grant, and additionally a triggering indication may be contained in the UL resource grant (e.g., DCI). The triggering indication indicates whether the UE 205 follows the configured behavior (e.g., Case B) or follows default (legacy) LCP rules in the granted UL resource (e.g., Case A). Said triggering indication may be communicated from the RAN node 210 to the UE 205 in DCI, as described above in the first solution. Based on the indication(s) (i.e., LCH Restriction indication 601 and, optionally, triggering indication in DCI), the UE 205 determines that a predefined number of UL allocations (e.g., of a multi-PUSCH grant) are to be restricted to certain LCHs (i.e., specified as described above, see block 615).

Figure 7:
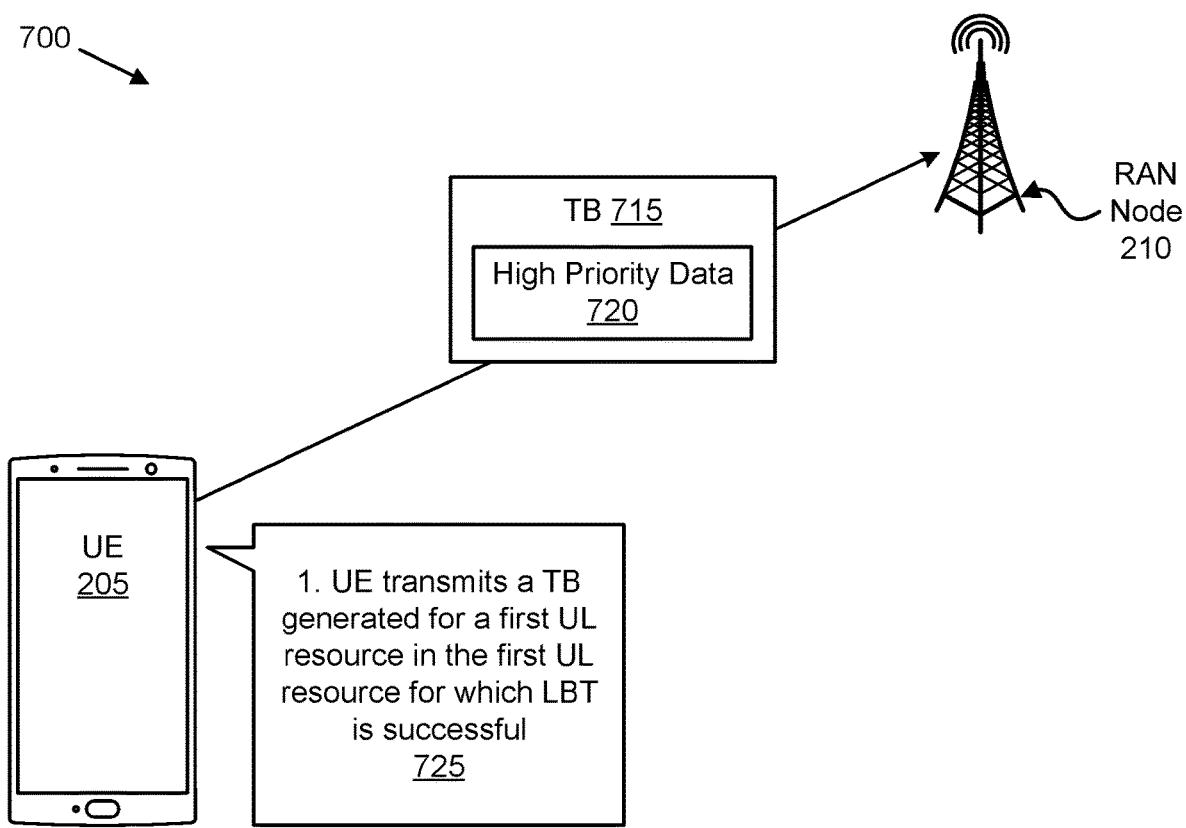
FIG. 7 is a diagram illustrating one embodiment of a sixth solution for transmitting data using unlicensed spectrum.

FIG. 7 depicts a RAN 700 implementing the sixth solution for transmitting data using unlicensed spectrum, according to embodiments of the disclosure. The RAN 700 includes the UE 205 and the RAN node 210. According to the sixth solution, a UE 205 may transmit a TB pending for transmission in a HARQ process due to a failed LBT in a different HARQ process being associated with a PUSCH for which LBT was successful. In case of undergoing a CCA/LBT procedure, the first UL resource has the highest probability of not being transmitted due to LBT failure. Therefore, the UE 205 may transmit the TB 715 generated for the first UL resource, which contains the high priority data 720 in the UE's buffer including potential MAC CE(s), in the first UL resource for which LBT is successful.

According to one implementation of the sixth solution, the UE 205 processes the UL grants in the signaled order and generates the corresponding TB(s) according to the current standardized LCP procedure (NR Rel-15). However, in order to not delay the transmission of higher priority packets which may not be always acceptable for, e.g., URLLC data, the UE 205 may map the generated TB(s) internally to different HARQ processes in case of LBT failure(s). Given the assumption that the TB size is the same for all or at least several UL grants, the dynamic mapping of TB(s) to HARQ processes should not impose any technical problems.

In one variant of the sixth solution, the UE 205 may transmit the TB 715 generated for the first UL resource, which contains the high priority data 720 in the UE's buffer including potential MAC CE(s), in the first non-partial slot of the UL resources for which LBT is successful (see block 725).

In another variant of the sixth solution, this behavior is allowed or not allowed according to a triggering indication. In other words, if the UE 205 is not indicated as being allowed (i.e., no triggering indication received), then the high priority data 720 is contained only in the TB 715 mapped to the first granted UL resource. Otherwise, if the triggering indication received at the UE 205 indicates as being allowed, it is up to the UE 205 whether high priority data is contained in the TB mapped to the first or later granted UL resource(s). This triggering indication may be an RRC configuration, or a MAC control element, or part of an UL resource grant (e.g., contained in DCI).

Figure 8:
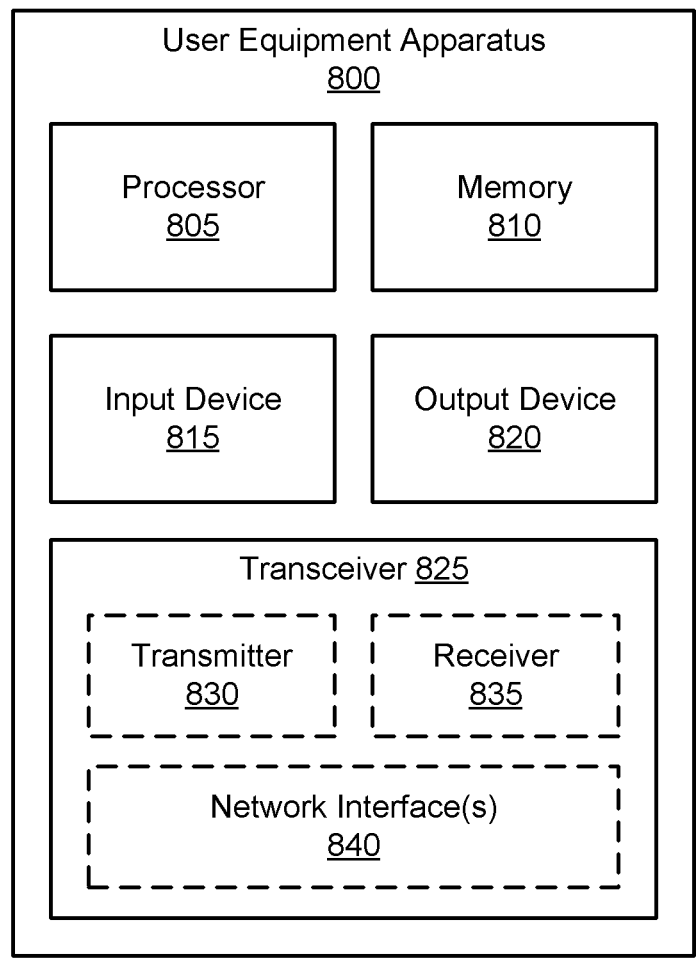
FIG. 8 is a diagram illustrating one embodiment of a user equipment apparatus that may be used for transmitting data using unlicensed spectrum.

FIG. 8 depicts a user equipment apparatus 800 that may be used for transmitting data using unlicensed spectrum, according to embodiments of the disclosure. In various embodiments, the user equipment apparatus 800 is used to implement one or more of the solutions described above. The user equipment apparatus 800 may be one embodiment of the remote unit 105 and/or the UE 205 described above.

Furthermore, the user equipment apparatus 800 may include a processor 805, a memory 810, an input device 15, an output device 820, and a transceiver 825. In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user equipment apparatus 800 to implement the above described UE behaviors. In various embodiments, the processor 805 modifies LCP behavior for a predefined number of UL resources according to the solutions described above. Via the transceiver 825, the processor 805 may receive an indicator, flag, configuration, etc. indicating whether data from certain LCHs is permitted in the predefined number of (first) UL resources. Additionally, via the transceiver 825, the processor 805 may receive an indicator, flag, configuration, etc. indicating whether a first generated TB for which LBT failed is permitted to use a subsequent UL resource for which LBT is successful, thereby "bumping" (e.g., being transmitted in place of) a later generated TB produced for the subsequent UL resource.

In some embodiments, the processor 805 performs a first LBT procedure for transmission of a first TB associated with a first UL grant using a first HARQ process, where the first LBT procedure results in LBT failure. Here, the first TB is stored in a transmission buffer of the first HARQ process. The processor 805 performs a second LBT procedure for transmission of a second TB associated with a second UL grant using a second HARQ process. The processor 805 controls the transceiver 825 to transmit the first TB using the second UL grant associated with the second HARQ process in response to the second LBT procedure resulting in LBT success.

In some embodiments, the first UL grant is a first UL allocation of a multi-PUSCH grant. In such embodiments, the second UL grant may be a second UL allocation of the multi-PUSCH grant. In certain embodiments, the multiple UL allocations of the multi-PUSCH grant are scheduled by a single DCI. In certain embodiments, the transmission of the first TB using the second UL grant includes transmitting in a first non-partial slot of the multi-PUSCH grant for which LBT is successful.

In some embodiments, the TB size of the first UL grant and the second UL grant are the same. In some embodiments, the first and the second UL grant are allocating resources for a new transmission. In some embodiments, the first UL grant is mapped to a first HARQ process and the second UL grant is mapped to a second HARQ process different than the first HARQ process.

In certain embodiments, the processor 805 stores the second TB in the transmission buffer of the first HARQ process in response to transmitting the first TB during the second UL grant. In some embodiments, the UE may be configured with an AUL grant, wherein the first UL grant is a first AUL opportunity of the AUL grant and the second UL grant is a second AUL opportunity of the AUL grant. In some embodiments, the UE may receive a configured grant, wherein the first UL grant is a first transmission opportunity of the configured grant and the second UL grant is a second transmission opportunity of the configured grant.

In some embodiments, transmitting the first TB using the second UL grant associated with the second HARQ process occurs in response to the first TB containing higher priority data than the second TB. In such embodiments, the processor 805 may receive an indication from a RAN node to modify LCP rules, where high priority data is excluded from the first TB in response to modifying the LCP rules, and control the transceiver 825 to transmit the second TB using the second UL grant in response to the first TB not containing high priority data and also in response to the second LBT procedure resulting in LBT success.

In various embodiments, the transceiver 825 receives DCI indicating a multi-PUSCH grant for the UE. Here, the processor 805 determines whether to modify LCP rules for a predetermined number of UL resources of the multi-PUSCH grant and generates a TB for a first of the predetermined number of UL resources of the multi-PUSCH grant according to applicable LCP rules.

In certain embodiments, the DCI includes a one-bit flag indicating whether to modify the LCP rules. In certain embodiments, the predetermined number of UL resources are located at the beginning of the multi-PUSCH grant.

In some embodiments, the processor 805 generates the TB by restricting the TB to data from specific LCHs in the predetermined number of UL resources of the multi-PUSCH grant. In some embodiments, the processor 805 generates the TB by only allowing data from delay-tolerant LCHs in the predetermined number of UL resources of the multi-PUSCH grant.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to transmitting data using unlicensed spectrum. For example, the memory 810 may store LCH data, LCP rules, TBs, and the like. In certain embodiments, the memory 810 also stores program code and related data, such as an operating system or other controller algorithms operating on the remote unit 105.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, a liquid crystal display ("LCD"), a light-emitting diode ("LED") display, an organic LED ("OLED") display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to provide UL communication signals to a base unit 110, such as the UL transmissions described herein. Similarly, one or more receivers 835 may be used to receive DL communication signals from the base unit 110, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an Application Specific Integrated Circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
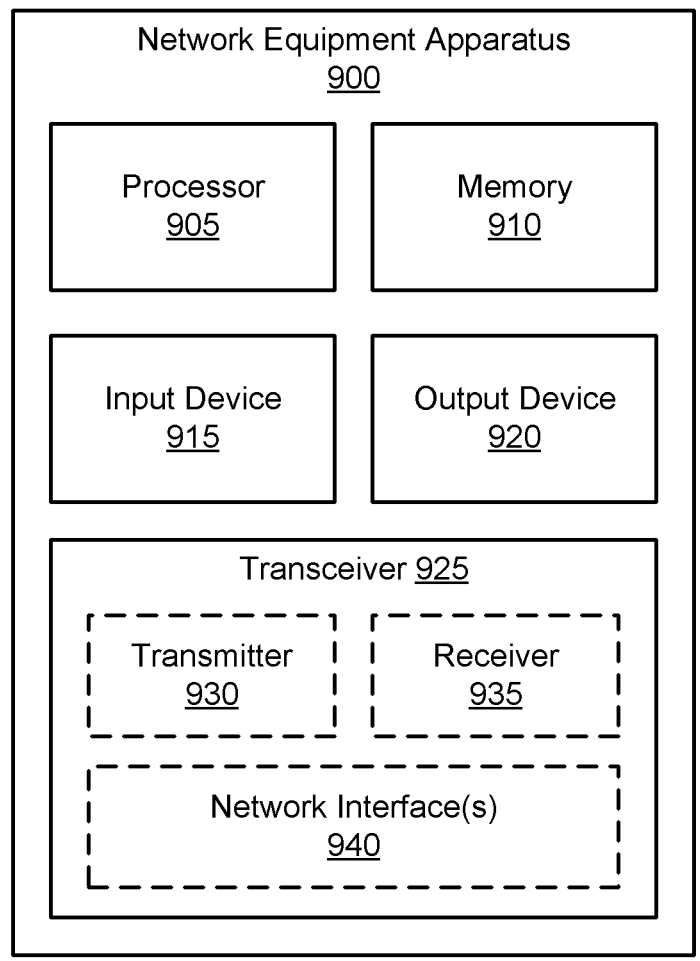
FIG. 9 is a diagram illustrating one embodiment of a network equipment apparatus that may be used for transmitting data using unlicensed spectrum.

FIG. 9 depicts a network equipment apparatus 900 that may be used for transmitting data using unlicensed spectrum, according to embodiments of the disclosure. The network equipment apparatus 900 may be one embodiment of the base unit 110 or RAN node, described above. Furthermore, the base network equipment apparatus 900 may include a processor 905, a memory 910, an input device 915, an output device 920, and a transceiver 925. In some embodiments, the input device 915 and the output device 920 are combined into a single device, such as a touchscreen. In certain embodiments, the network equipment apparatus 900 may not include any input device 915 and/or output device 920. In various embodiments, the network equipment apparatus 900 may include one or more of: the processor 905, the memory 910, and the transceiver 925, and may not include the input device 915 and/or the output device 920.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the processor 905 controls the network equipment apparatus 900 to implement the above described RAN node behaviors. For example, the processor 905 may control the transceiver 925 to send a UL grant to a UE (e.g. remote unit 105). In various embodiments, the UL grant may be a multi-TTI/multi-PUSCH grant.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to transmitting data using unlicensed spectrum. For example, the memory 910 may store various parameters, configurations, policies, and the like as described above. In certain embodiments, the memory 910 also stores program code and related data, such as an operating system or other controller algorithms operating on the network equipment apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD, an LED display, an OLED display, a projector, or similar display device capable of outputting images, text, or the like to a user. As another, non-limiting, example, the output device 920 may include a wearable display separate from, but communicatively coupled to, the rest of the network equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more sets of transmitters 930 and receivers 935 may be used to communicate with the UE, as described herein. Similarly, one or more sets of transmitters 930 and receivers 935 may be used to communicate with network functions in the PLMN and/or RAN, as described herein. Although only one transmitter 930 and one receiver 935 are illustrated, the network equipment apparatus 900 may have any suitable number of transmitters 930 and receivers 935. Further, the transmitter(s) 930 and the receiver(s) 935 may be any suitable type of transmitters and receivers. In various embodiments, the transceiver 925 may include or support at least one network interface 940.

Figure 10:
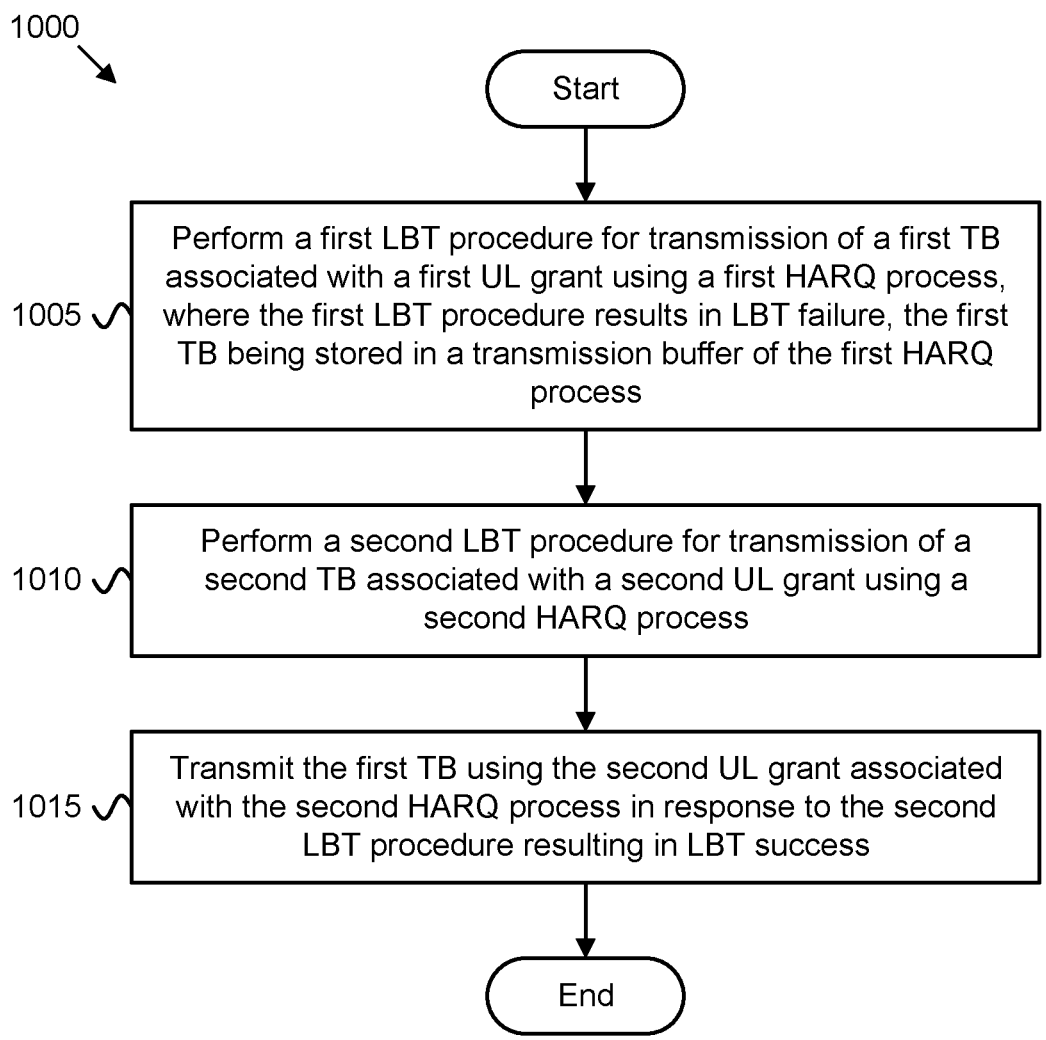
FIG. 10 is a flowchart diagram illustrating one embodiment of a method that may be used for transmitting data using unlicensed spectrum.

FIG. 10 depicts one embodiment of a method 1000 for transmitting data using unlicensed spectrum, according to embodiments of the disclosure. In various embodiments, the method 1000 is performed by a UE, such as the remote unit 105, the UE 205, and/or the user equipment apparatus 800, described above. In some embodiments, the method 1000 is performed by a processor, such as a microcontroller, a microprocessor, a CPU, a GPU, an auxiliary processing unit, a FPGA, or the like.

The method 1000 begins and performs 1005 a first LBT procedure for transmission of a first TB associated with a first UL grant using a first HARQ process, where the first LBT procedure results in LBT failure, the first TB being stored in a transmission buffer of the first HARQ process. The method 1000 includes performing 1010 a second LBT procedure for transmission of a second TB associated with a second UL grant using a second HARQ process. The first method includes transmitting 1015 the first TB using the second UL grant associated with the second HARQ process in response to the second LBT procedure resulting in LBT success. The method 1000 ends.

Figure 11:
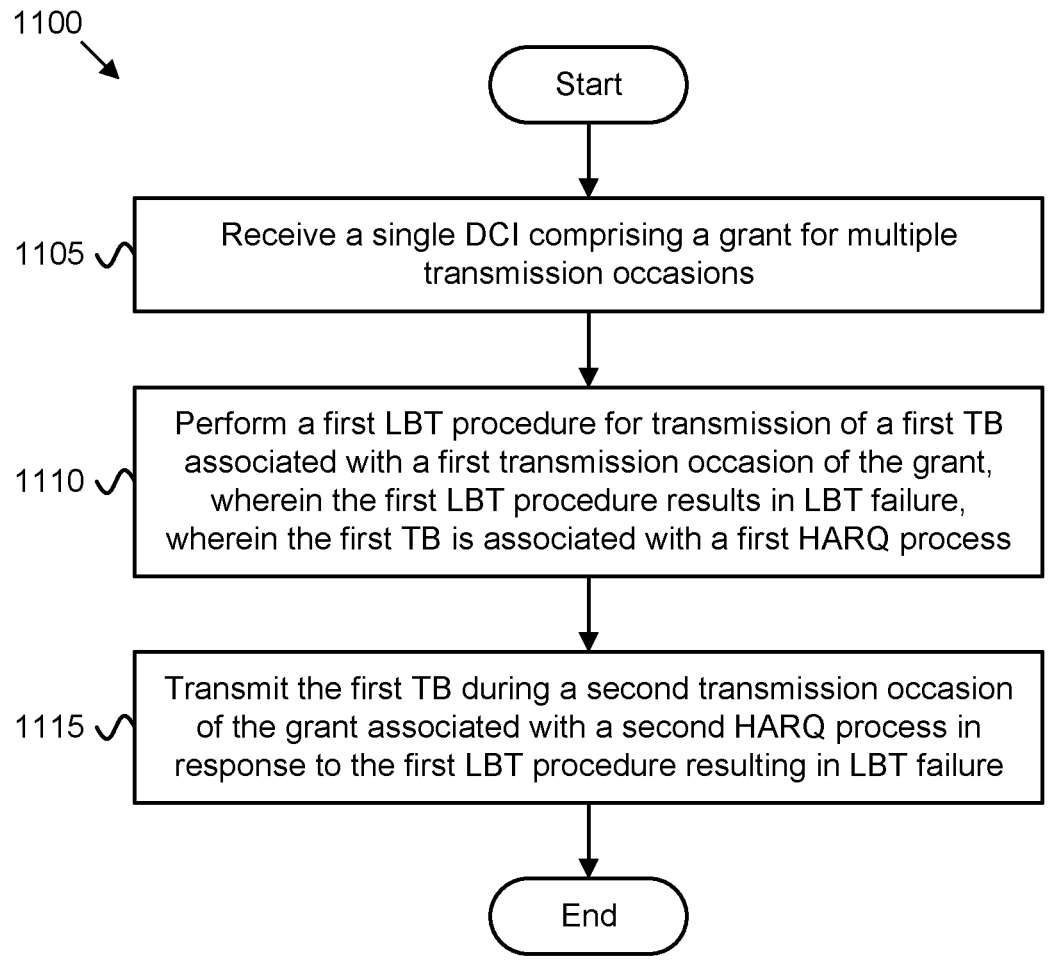
FIG. 11 is a flowchart diagram illustrating another embodiment of a method that may be used for transmitting data using unlicensed spectrum.

FIG. 11 depicts one embodiment of a method 1100 for transmitting data in an access network using unlicensed spectrum, according to embodiments of the disclosure. In various embodiments, the method 1100 is performed by a UE, such as the remote unit 105, the UE 205, and/or the user equipment apparatus 800, described above. In some embodiments, the method 1100 is performed by a processor, such as a microcontroller, a microprocessor, a CPU, a GPU, an auxiliary processing unit, a FPGA, or the like.

The method 1100 begins and receives 1105 a single DCI comprising a grant for multiple transmission occasions. The method 1100 includes performing 1110 a first LBT procedure for transmission of a first TB associated with a first transmission occasion of the grant, where the first LBT procedure results in LBT failure and where the first TB is associated with a first HARQ process. The method 1100 includes transmitting 1115 the first TB during a second transmission occasion of the grant associated with a second HARQ process in response to the first LBT procedure resulting in LBT failure. The method 1100 ends.

Disclosed herein is a first apparatus for transmitting data using unlicensed spectrum, according to embodiments of the disclosure. The first apparatus may be implemented by a UE, such as the remote unit 105, the UE 205, and/or the user equipment apparatus 800. The first apparatus includes a processor that performs a first LBT procedure for transmission of a first TB associated with a first UL grant using a first HARQ process, where the first LBT procedure results in LBT failure, the first TB being stored in a transmission buffer of the first HARQ process. The processor also performs a second LBT procedure for transmission of a second TB associated with a second UL grant using a second HARQ process. The first apparatus includes a transceiver that transmits the first TB using the second UL grant associated with the second HARQ process in response to the second LBT procedure resulting in LBT success.

In some embodiments, the first UL grant is a first UL allocation of a multi-PUSCH grant. In such embodiments, the second UL grant may be a second UL allocation of a multi-PUSCH grant. In certain embodiments, the multiple UL allocations of the multi-PUSCH grant are scheduled by a single DCI. In certain embodiments, the transmission of the first TB using the second UL grant includes transmitting in a first non-partial slot of the multi-PUSCH grant for which LBT is successful.

In some embodiments, the TB size of the first UL grant and the second UL grant are the same. In some embodiments, the first and the second UL grant are allocating resources for a new transmission. In some embodiments, the first UL grant is mapped to a first HARQ process and the second UL grant is mapped to a second HARQ process different than the first HARQ process.

In certain embodiments, the processor stores the second TB in the transmission buffer of the first HARQ process in response to transmitting the first TB during the second UL grant. In some embodiments, the UE may be configured with an AUL grant, where the first UL grant is a first AUL opportunity of the AUL grant and the second UL grant is a second AUL opportunity of the AUL grant.

In some embodiments, transmitting the first TB using the second UL grant associated with the second HARQ process occurs in response to the first TB containing higher priority data than the second TB. In such embodiments, the processor may receive an indication from a RAN node to modify LCP rules, where high priority data is excluded from the first TB in response to modifying the LCP rules. In such embodiments, the processor may control the transceiver to transmit the second TB using the second UL grant in response to the first TB not containing high priority data and also in response to the second LBT procedure resulting in LBT success.

Disclosed herein is a first method for transmitting data using unlicensed spectrum, according to embodiments of the disclosure. The first method may be performed by a UE, such as the remote unit 105, the UE 205, and/or the user equipment apparatus 800. The first method includes performing a first LBT procedure for transmission of a first TB associated with a first UL grant using a first HARQ process, where the first LBT procedure results in LBT failure, the first TB being stored in a transmission buffer of the first HARQ process. The first method includes performing a second LBT procedure for transmission of a second TB associated with a second UL grant using a second HARQ process and transmitting the first TB using the second UL grant associated with the second HARQ process in response to the second LBT procedure resulting in LBT success.

In some embodiments, the first UL grant is a first UL allocation of a multi-PUSCH grant. In such embodiments, the second UL grant may be a second UL allocation of a multi-PUSCH grant. In certain embodiments, the multiple UL allocations of the multi-PUSCH grant are scheduled by a single DCI. In certain embodiments, the transmission of the first TB using the second UL grant includes transmitting in a first non-partial slot of the multi-PUSCH grant for which LBT is successful.

In some embodiments, the TB size of the first UL grant and the second UL grant are the same. In some embodiments, the first and the second UL grant are allocating resources for a new transmission. In some embodiments, the first UL grant is mapped to a first HARQ process and the second UL grant is mapped to a second HARQ process different than the first HARQ process.

In certain embodiments, the first method includes storing the second TB in the transmission buffer of the first HARQ process in response to transmitting the first TB during the second UL grant. In some embodiments, the UE may be configured with an AUL grant, where the first UL grant is a first AUL opportunity of the AUL grant and the second UL grant is a second AUL opportunity of the AUL grant.

In some embodiments, transmitting the first TB using the second UL grant associated with the second HARQ process occurs in response to the first TB containing higher priority data than the second TB. In such embodiments, the first method may further include receiving an indication from a RAN node to modify LCP rules, where high priority data is excluded from the first TB in response to modifying the LCP rules, and transmitting the second TB using the second UL grant in response to the first TB not containing high priority data and also in response to the second LBT procedure resulting in LBT success.

Disclosed herein is a second apparatus for transmitting data using unlicensed spectrum, according to embodiments of the disclosure. The second apparatus may be implemented by a UE, such as the remote unit 105, the UE 205, and/or the user equipment apparatus 800. The second apparatus includes a transceiver that receives DCI indicating a multi-PUSCH grant for the UE. The second apparatus also include a processor that determines whether to modify LCP rules for a predetermined number of UL resources of the multi-PUSCH grant and generates a TB for a first of the predetermined number of UL resources of the multi-PUSCH grant according to applicable LCP rules.

In certain embodiments, the DCI includes a one-bit flag indicating whether to modify the LCP rules. In certain embodiments, the predetermined number of UL resources are located at the beginning of the multi-PUSCH grant.

In some embodiments, the processor generates the TB by restricting the TB to data from specific LCHs in the predetermined number of UL resources of the multi-PUSCH grant. In some embodiments, the processor generates the TB by only allowing data from delay-tolerant LCHs in the predetermined number of UL resources of the multi-PUSCH grant.

Disclosed herein is a second method for transmitting data using unlicensed spectrum, according to embodiments of the disclosure. The second method may be performed by a UE, such as the remote unit 105, the UE 205, and/or the user equipment apparatus 800. The second method includes receiving DCI indicating a multi-PUSCH grant for the UE and determining whether to modify LCP rules for a predetermined number of UL resources of the multi-PUSCH grant. The second method includes generating a TB for a first of the predetermined number of UL resources of the multi-PUSCH grant according to applicable LCP rules.

In certain embodiments, the DCI includes a one-bit flag indicating whether to modify the LCP rules. In certain embodiments, the predetermined number of UL resources are located at the beginning of the multi-PUSCH grant.

In some embodiments, generating the TB includes restricting the TB to data from specific LCHs in the predetermined number of UL resources of the multi-PUSCH grant. In some embodiments, generating the TB includes allowing only data from delay-tolerant LCHs in the predetermined number of UL resources of the multi-PUSCH grant.

Disclosed herein is a third apparatus for transmitting data using unlicensed spectrum, according to embodiments of the disclosure. The third apparatus may be implemented by a communication apparatus, such as the remote unit 105, the UE 205, and/or the user equipment apparatus 800, as described above. The third apparatus includes a memory including instructions executable by a processor to cause the third apparatus to: A) receive a single DCI including a grant for multiple transmission occasions; B) perform a first LBT procedure for transmission of a first TB associated with a first transmission occasion of the grant, where the first LBT procedure results in LBT failure and where the first TB is associated with a first HARQ process; and C) transmit the first TB during a second transmission occasion of the grant associated with a second HARQ process in response to the first LBT procedure resulting in LBT failure.

In some embodiments, the instructions are executable by the processor to cause the apparatus to: A) perform a second LBT procedure for the second transmission occasion; and B) transmit the first TB during the second transmission occasion based at least in part on the second LBT procedure resulting in LBT success. In some embodiments, the first transmission occasion and the second transmission occasion have a same TB size, where a New Data Indicator is toggled for each of the first and second transmissions, and where the first HARQ process is different than the second HARQ process.

In some embodiments, to transmit the first TB during the second transmission occasion, the instructions are executable by the processor to cause the apparatus to transmit in a first non-partial slot of the grant for multiple transmission occasions for which a respective LBT procedure is successful. In some embodiments, the apparatus is configured with an AUL grant, where the first transmission occasion includes a first AUL opportunity of the AUL grant and the second transmission includes a second AUL opportunity of the AUL grant.

In some embodiments, the second transmission occasion is associated with a second TB. In such embodiments, the instructions are executable by the processor to cause the apparatus to store the second TB in a transmission buffer of the first HARQ process in response to the transmission of the first TB using the second transmission occasion. In certain embodiments, the first TB includes higher priority data than the second TB.

In some embodiments, the DCI includes a one-bit flag indicating whether to modify the LCP rules for a predetermined number of transmission resources of the grant for multiple transmission occasions. In such embodiments, the instructions are executable by the processor to cause the apparatus to generate a second TB for a first of the predetermined number of transmission resources of the grant for multiple transmission occasions according to applicable LCP rules.

In certain embodiments, to generate the second TB, the instructions are executable by the processor to cause the apparatus to allow only data from delay-tolerant logical channels in the predetermined number of transmission resources of the grant for multiple transmission occasions. In certain embodiments, the predetermined number of transmission resources are located at the beginning of the grant for multiple transmission occasions.

Disclosed herein is a third method for transmitting data using unlicensed spectrum, according to embodiments of the disclosure. The third method may be performed by a communication device, such as a remote unit 105, a UE 205, and/or the user equipment apparatus 800, as described above. The third method includes receiving a single DCI including a grant for multiple transmission occasions and performing a first LBT procedure for transmission of a first TB associated with a first transmission occasion of the grant, where the first LBT procedure results in LBT failure and where the first TB is associated with a first HARQ process. The further method includes transmitting the first TB during a second transmission occasion of the grant associated with a second HARQ process in response to the first LBT procedure resulting in LBT failure.

In some embodiments, the third method includes performing a second LBT procedure for the second transmission occasion. In such embodiments, transmitting the first TB during the second transmission occasion is based at least in part on the second LBT procedure resulting in LBT success. In some embodiments, the first transmission occasion and the second transmission occasion have a same TB size, where a New Data Indicator is toggled for each of the first and second transmissions, and where the first HARQ process is different than the second HARQ process.

In some embodiments, transmitting the first TB during the second transmission occasion includes transmitting in a first non-partial slot of the grant for multiple transmission occasions for which a respective LBT procedure is successful. In some embodiments, the apparatus is configured with an AUL grant, where the first transmission occasion includes a first AUL opportunity of the AUL grant and the second transmission includes a second AUL opportunity of the AUL grant.

In some embodiments, the second transmission occasion is associated with a second TB. In such embodiments, the third method includes storing the second TB in a transmission buffer of the first HARQ process in response to transmitting the first TB using the second transmission occasion. In certain embodiments, the first TB includes higher priority data than the second TB.

In some embodiments, the DCI includes a one-bit flag indicating whether to modify the LCP rules for a predetermined number of transmission resources of the grant for multiple transmission occasions. In such embodiments, the third method includes generating a TB for a first of the predetermined number of transmission resources of the grant for multiple transmission occasions according to applicable LCP rules.

In certain embodiments, generating the TB includes allowing only data from delay-tolerant logical channels in the predetermined number of resources of the grant for multiple transmission occasions. In certain embodiments, the predetermined number of resources are located at the beginning of the grant for multiple transmission occasions.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
    at least one memory; and
    at least one processor coupled with the at least one memory and configured to cause the UE to:
        receive a downlink control information ("DCI") comprising a grant for multiple transmission occasions associated with different hybrid automatic repeat request ("HARQ") processes, wherein the DCI identifies a first HARQ process associated with a first transmission occasion of the multiple transmission occasions;
        generate a first transport block ("TB") for the first HARQ process;
        perform a first listen-before-talk ("LBT") procedure for transmission of the first TB associated with the first transmission occasion, wherein the first LBT procedure results in LBT failure;
        transmit the first TB during a second transmission occasion associated with a second HARQ process in response to the first LBT procedure resulting in LBT failure; and
        map the first TB to the second HARQ process in response to the first LBT procedure resulting in LBT failure.

2. The UE of claim 1, wherein the at least one processor is configured to cause the UE to:
    perform a second LBT procedure for the second transmission occasion; and
    transmit the first TB during the second transmission occasion based at least in part on the second LBT procedure resulting in LBT success.

3. The UE of claim 1, wherein the first transmission occasion and the second transmission occasion have a same TB size, wherein a New Data Indicator is toggled for each of the first transmission occasion and the second transmission occasion, and wherein the first HARQ process is different than the second HARQ process.

4. The UE of claim 1, wherein to transmit the first TB during the second transmission occasion, the at least one processor is configured to cause the UE to transmit in a first non-partial slot of the grant for multiple transmission occasions for which a respective LBT procedure is successful.

5. The UE of claim 1, wherein the second transmission occasion is associated with a second TB, and wherein the at least one processor is configured to cause the UE to store the second TB in a transmission buffer of the first HARQ process in response to the transmission of the first TB using the second transmission occasion.

6. The UE of claim 5, wherein the first TB comprises higher priority data than the second TB.

7. The UE of claim 1, wherein the UE is configured with an autonomous UL ("AUL") grant, wherein the first transmission occasion comprises a first AUL opportunity of the AUL grant and the second transmission occasion comprises a second AUL opportunity of the AUL grant.

8. The UE of claim 1, wherein the DCI includes a one-bit flag indicating whether to modify Logical Channel Prioritization ("LCP") rules for a predetermined number of transmission resources of the grant for multiple transmission occasions, wherein the instructions are executable by the at least one processor is configured to cause the UE to generate a second TB for a first of the predetermined number of transmission resources of the grant for multiple transmission occasions according to applicable LCP rules.

9. The UE of claim 8, wherein to generate the second TB, the at least one processor is configured to cause the UE to allow only data from delay-tolerant logical channels in the predetermined number of transmission resources of the grant for multiple transmission occasions.

10. The UE of claim 8, wherein the predetermined number of transmission resources are located at a beginning of the grant for multiple transmission occasions.

11. A method performed by a user equipment ("UE"), the method comprising:
  receiving a downlink control information ("DCI") comprising a grant for multiple transmission occasions associated with different hybrid automatic repeat request ("HARQ") processes, wherein the DCI identifies a first HARQ process associated with a first transmission occasion of the multiple transmission occasions;
  generating a first transport block ("TB") for the first HARQ process;
  performing a first listen-before-talk ("LBT") procedure for transmission of the first TB associated with the first transmission occasion, wherein the first LBT procedure results in LBT failure;
  transmitting the first TB during a second transmission occasion associated with a second HARQ process in response to the first LBT procedure resulting in LBT failure; and
  mapping the first TB to the second HARQ process in response to the first LBT procedure resulting in LBT failure.

12. The method of claim 11, further comprising performing a second LBT procedure for the second transmission occasion, wherein transmitting the first TB during the second transmission occasion is based at least in part on the second LBT procedure resulting in LBT success.

13. The method of claim 11, wherein the first transmission occasion and the second transmission occasion have a same TB size, wherein a New Data Indicator is toggled for each of the first and second transmissions, and wherein the first HARQ process is different than the second HARQ process.

14. The method of claim 11, wherein transmitting the first TB during the second transmission occasion comprises transmitting in a first non-partial slot of the grant for multiple transmission occasions for which a respective LBT procedure is successful.

15. The method of claim 11, wherein the second transmission occasion is associated with a second TB, the method further comprising storing the second TB in a transmission buffer of the first HARQ process in response to transmitting the first TB using the second transmission occasion.

16. The method of claim 15, wherein the first TB comprises higher priority data than the second TB.

17. The method of claim 11, wherein the UE is configured with an autonomous UL ("AUL") grant, wherein the first transmission occasion comprises a first AUL opportunity of the AUL grant and the second transmission comprises a second AUL opportunity of the AUL grant.

18. The method of claim 11, wherein the DCI includes a one-bit flag indicating whether to modify Logical Channel Prioritization ("LCP") rules for a predetermined number of transmission resources of the grant for multiple transmission occasions, the method further comprising generating a TB for a first of the predetermined number of transmission resources of the grant for multiple transmission occasions according to applicable LCP rules.

19. The method of claim 18, wherein generating the TB comprises allowing only data from delay-tolerant logical channels in the predetermined number of resources of the grant for multiple transmission occasions.

20. The method of claim 18, wherein the predetermined number of resources are located at a beginning of the grant for multiple transmission occasions.

* * * * *